United States Patent [19]
Reeves et al.

[11] Patent Number: 5,918,023
[45] Date of Patent: Jun. 29, 1999

[54] SYSTEM DESIGN TO SUPPORT EITHER PENTIUM PRO PROCESSORS, PENTIUM II PROCESSORS, AND FUTURE PROCESSOR WITHOUT HAVING TO REPLACE THE SYSTEM BOARD

[75] Inventors: Earl C. Reeves, Tomball; David M. Olson; Kameron H. Ayati, both of Houston; Gary W. Thome, Tomball, all of Tex.

[73] Assignee: Compaq Computer Corporation, Houston, Tex.

[21] Appl. No.: 08/871,154

[22] Filed: Jun. 9, 1997

[51] Int. Cl.[6] .................................................. G06F 13/00
[52] U.S. Cl. .......................... 395/282; 395/280; 395/281; 395/306; 395/309
[58] Field of Search .................................... 395/282, 280, 395/281, 306, 309

[56] References Cited

U.S. PATENT DOCUMENTS

| | | | |
|---|---|---|---|
| 4,912,401 | 3/1990 | Nady, II et al. | 324/755 |
| 5,321,827 | 6/1994 | Lu et al. | 395/500 |
| 5,442,520 | 8/1995 | Kemp et al. | 361/785 |
| 5,490,279 | 2/1996 | Golbert et al. | 395/800.01 |
| 5,546,563 | 8/1996 | Chuang | 395/500 |
| 5,586,270 | 12/1996 | Rotier et al. | 395/282 |
| 5,706,447 | 1/1998 | Vivio | 395/309 |

OTHER PUBLICATIONS intel® Pentium® ProFamily Developer's Manual vol. 1: Specifications, Chapters 1, 3, 4, 9, 11, 12, 13, 14 and 15, Appendix A, 1996.
intel® Pentium® II Processor at 233 MHZ, 266 MHZ, 300 MHZ, and 333 MHZ, Chapters 1, 2, 3, 4 and 5, Appendix A.1, 1996.

Primary Examiner—Ayaz R. Sheikh
Assistant Examiner—Ario Etienne
Attorney, Agent, or Firm—Akin, Gump, Strauss, Hauer & Feld

[57] ABSTRACT

A method and apparatus for designing a computer system which supports multiple processors of different types. A processor base board is separately connectable to a system board. The processor base board includes a number of connectors for receiving processor boards. The processor boards include a processor and, if necessary, a voltage regulator and voltage level converters. A right angle single edge contact connector is used on a Pentium II board to significantly reduce spacing requirements of adjacent processor boards. A conventional pin grid array type socket is used for a Pentium Pro processor board. A special mapping of bus request signals is disclosed for supporting four Pentium Pro processors or two Pentium II processors without requiring changes to the processor base board.

19 Claims, 9 Drawing Sheets

SYSTEM DESIGN TO SUPPORT EITHER PENTIUM PRO PROCESSORS, PENTIUM II PROCESSORS, AND FUTURE PROCESSOR WITHOUT HAVING TO REPLACE THE SYSTEM BOARD

BACKGROUND OF THE INVENTION

1. Field of the Invention

The invention relates to a method and apparatus for connecting different processors to a single computer system board.

2. Description of the Related Art

As microprocessors (or simply processors) have become faster, more powerful and feature laden the electrical and physical interfaces to these processors have also changed. For example, the Intel Pentium is different from the Intel Pentium Pro processor which is different from the Intel Pentium II processor. Future processors are also likely to have their differences.

In the past, system boards were designed to support only one type of processor. To overcome this limitation, Intel developed upgrade processors for each of its standard processors. These upgrade processors would typically plug into the same socket as that of the processor it was replacing. For example, a Pentium processor can be upgraded with a Pentium upgrade processor. The system board included a socket for the processor or upgrade processor. Alternatively, the system board would include a separate socket for the upgrade processor. However, this limited the upgrade capability of the computer system to the number of processors available that met the specification for the existing socket. Thus, to effectively upgrade an existing processor the upgrade processor had to meet the existing physical and electrical requirements.

Alternatively, the existing system board could be replaced with a new system board containing a higher performance processor not available as an upgrade processor. Replacing the system board usually provides better performance gains than simply upgrading the processor. However, this method is less desirable due to the complexity and added cost involved in exchanging system boards.

Another variation known in the art is to partition the system board into two different boards. One board for supporting the system logic and another board for supporting the processor. A Compaq SystemPro is one example. Typically, the processor board would contain much of the logic related to keeping the processor performing at optimum speed, such as memory cache and related logic. In this way, an upgrade was implemented by replacing only the processor board. This method had the advantage of overcoming he limitation brought about by relying on the processor upgrade. However, each supported processor would require a new processor board design.

It is desirable to support a single system board with a wide variety of processors and future processors, but in a cost effective manner.

SUMMARY OF THE INVENTION

A computer system according to the preferred embodiment includes a system board and a processor base board. The system board holds much of the system logic of the computer system including logic for retrieving data from hard drives. The processor base board includes connectors for receiving processor boards and logic for interfacing processors to the remaining system logic. The processor boards include one or more sockets each for receiving a processor and, if necessary, connectors for receiving voltage regulation modules.

One type of processor board supported is for a Pentium Pro processor. The Pentium Pro processor board accepts signals directly from the processor base board as the signals are supplied at the required voltages. Another type of processor board support is for a Pentium II processor. The Pentium II processor board requires voltage conversion for certain signals. Thus, by providing a different processor board for each different type of processor, the specific voltage requirements can be easily handled on the processor board without affecting the processor base board. In the case of the Pentium II processor, a 2.5 v regulator and voltage level shifters are included to convert input signals from 3.3 v (as supplied by the processor base board) to 2.5 v.

The Pentium Pro supports multiprocessing with up to four processors. The Pentium II processor, however, only supports two. To support the arbitration differences between the two type of processors, a bus request mapping was performed on the Pentium II processor board, thereby not requiring any special switching circuitry on the processor base board.

A further advance was made with a single edge contact connector used to connect the Pentium II processor to the Pentium II processor board. A right angle connector is utilized to receive the Pentium II parallel with the plane of the Pentium II processor board. This allows the processor boards to be positioned much closer to each other than if the Pentium II processor were inserted in a conventional perpendicular arrangement.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
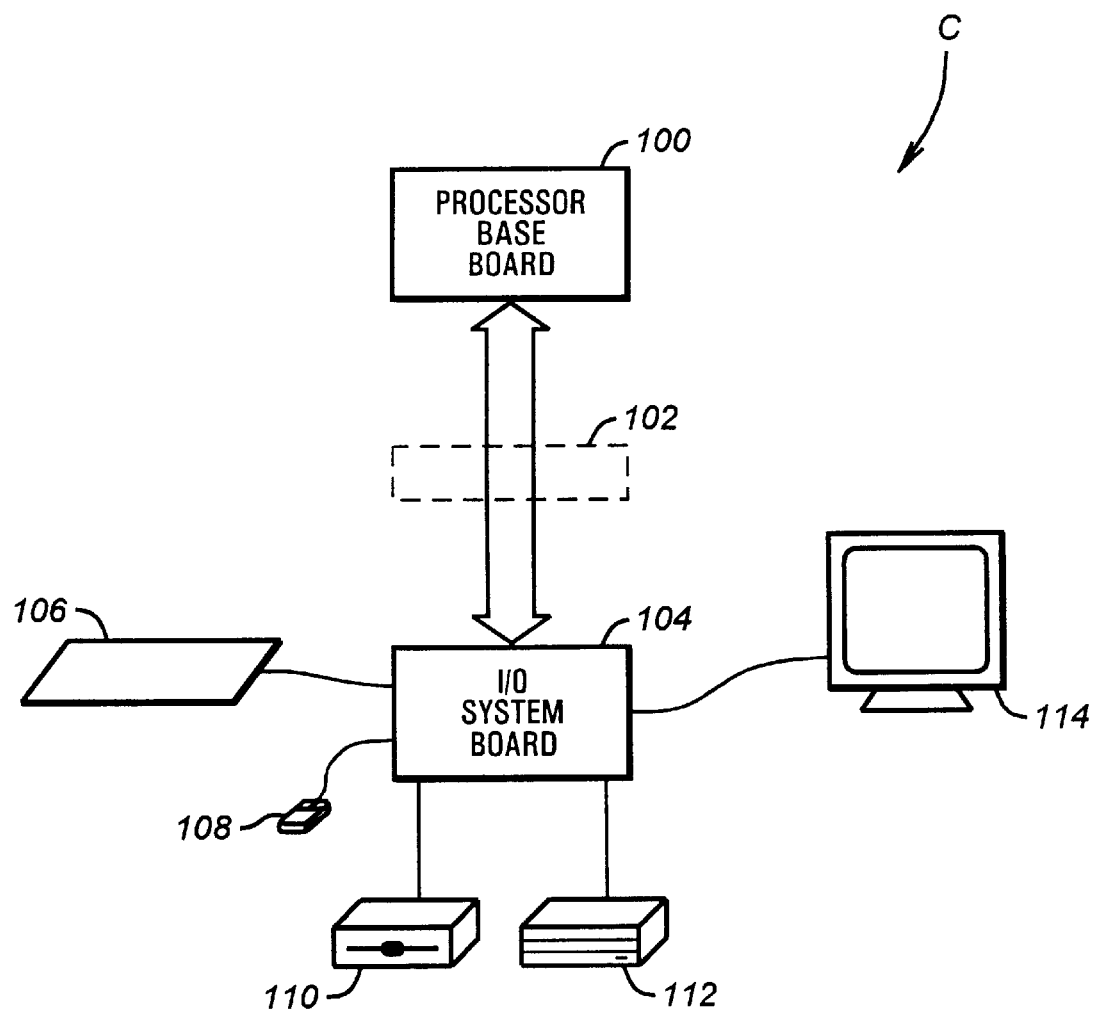
FIG. 1 is a block diagram illustrating the major components of a computer system C according to the preferred embodiment.

Turning now to the drawings, in FIG. 1, there is illustrated a computer system C according to the preferred embodiment including a processor base board 100 connected to an I/O (input/output) system board 104 via a system backplane board 102. The I/O system board 104 includes circuitry for supporting a peripheral component interconnect (PCI) bus (not shown), an industry standard architecture (ISA) bus (not shown), a keyboard 106, a mouse 108, a floppy disk 110, a hard disk and/or CD ROM 112 and a monitor 114.

Figure 2A:
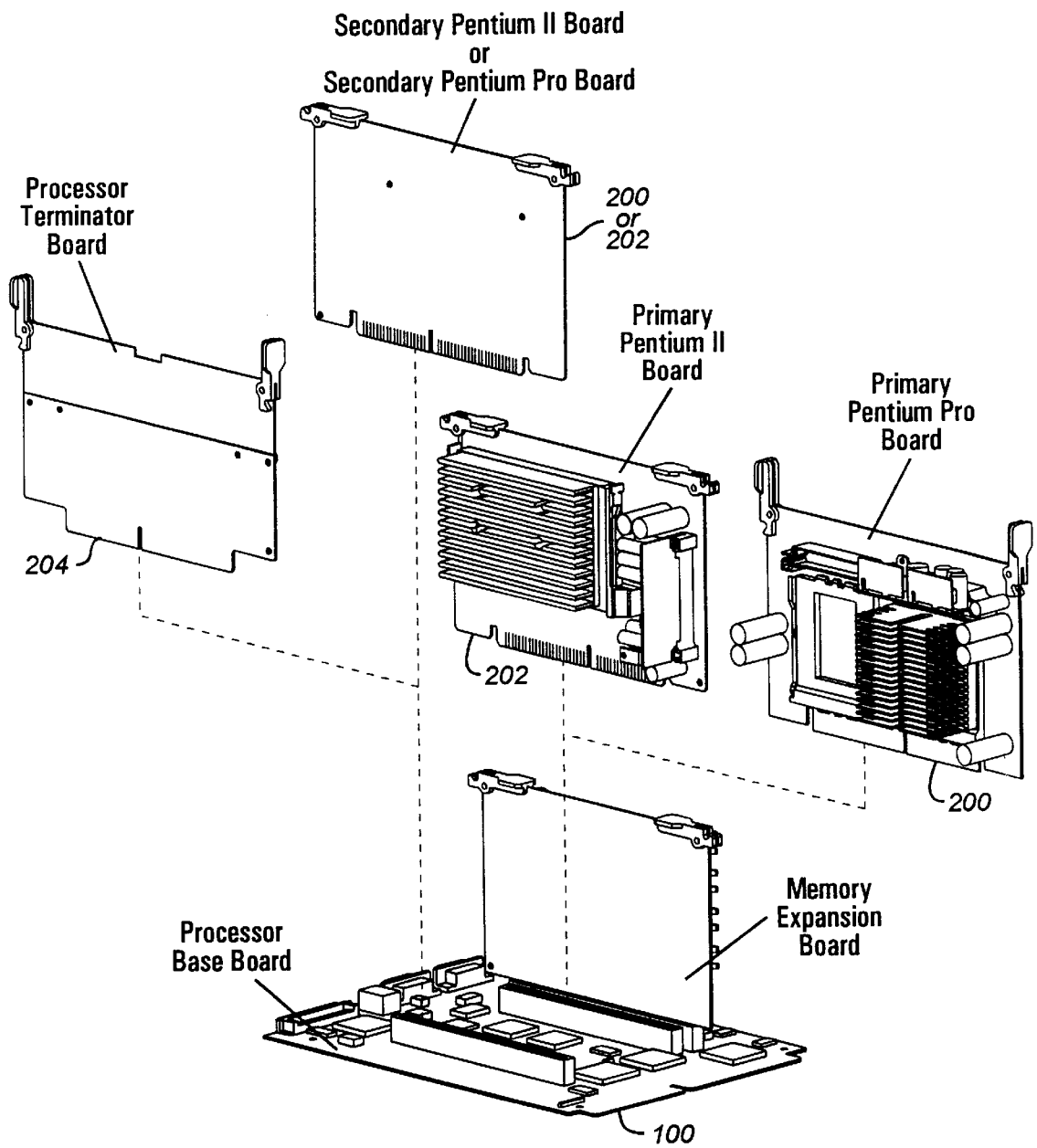
FIG. 2A is an exploded view of a processor base board and its installable components according to the preferred embodiment and FIG. 2B is an isometric view of a processor cage assembly according to the preferred embodiment.

Now referring to FIG. 2A, there is illustrated an exploded view of the components installable into the processor base board 100. The processor base board 100 can receive either two Pentium Pro boards 200 or two Pentium II boards 202. If either a single Pentium Pro board 200 or a single Pentium II board 202 is installed, then a processor terminator board 204 is installed into the empty slot. A third slot receives a memory expansion board 206.

The combination of components is unique from conventional motherboard designs. By separating the processor circuitry from the processor base board, a single processor base board 100 and I/O system board 104 can support a variety of processors and future processors. The circuitry unique to a particular type of processor no longer requires design changes to the processor base board 100 or I/O system board 104. As new processors are introduced with different voltage and signaling requirements, a specific board containing any required conversion logic can be designed so that the new processor is adapted to work with the existing computer system C.

Figure 2B:
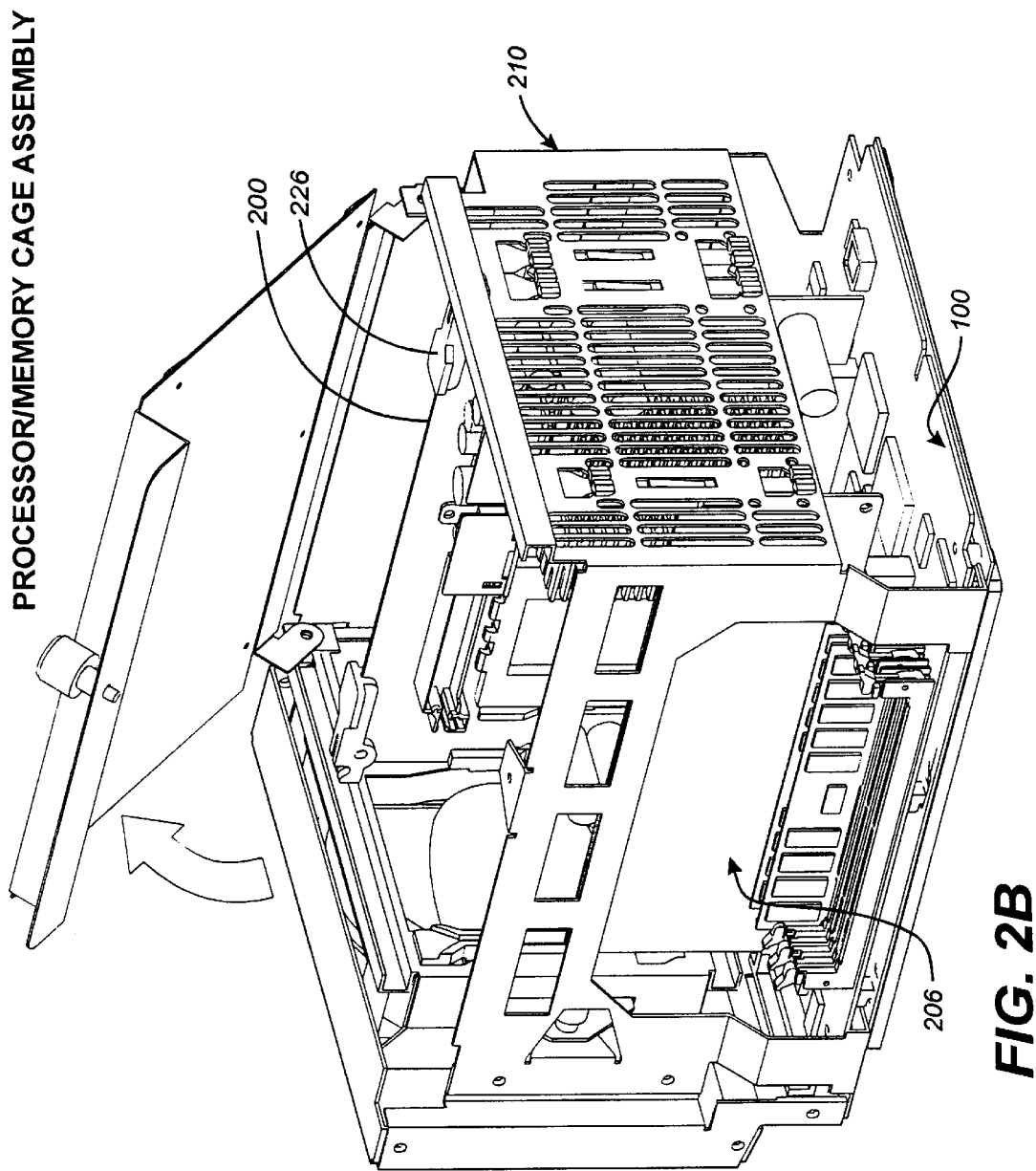

Now referring to FIG. 2B, there is illustrated a processor cage 210 which is useful to mount the processor base board 100 therein. The processor cage 210 is removable from the computer system C to conveniently install the Pentium Pro and Pentium II processor boards 200 and 202.

Figure 3:
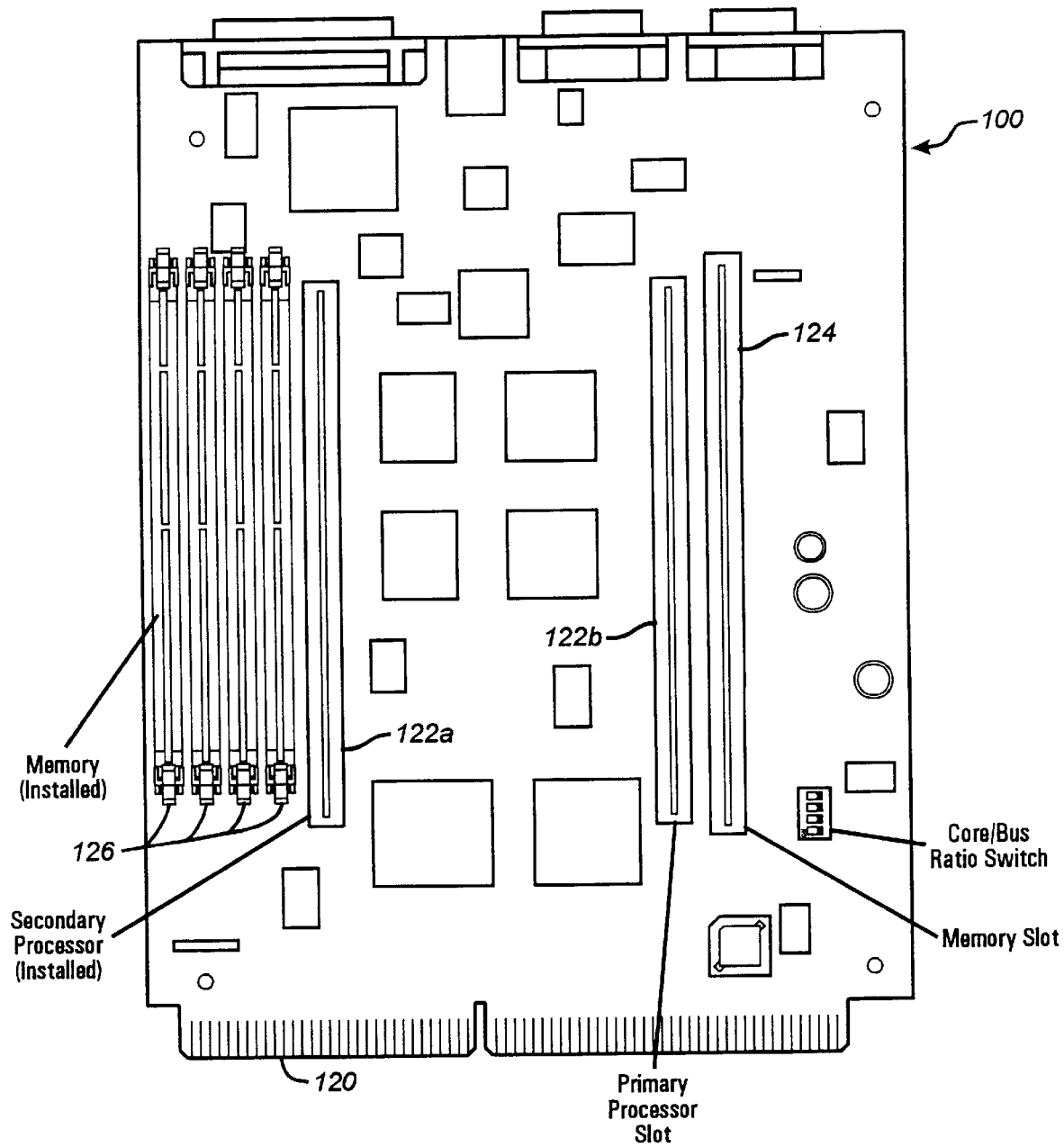
FIG. 3 is a top view of the processor base board according to the preferred embodiment.

Now referring to FIG. 3, there are illustrated further details of the processor base board 100. Spaced sufficiently apart are a pair of processor slots 122a and 122b for receiving either the Pentium Pro board 200 or Pentium II board 202. The connectors 122a and 122b are attached to the processor base board 100 so that the Pentium Pro board 200 and Pentium II board 202 are received perpendicular to the plane of the processor base board 100. Slot 122b is a primary slot and slot 122a is a secondary slot. Four memory dual-in-line memory module (DIMM) slots 126 are provided to receive conventional memory. A slot 124 is provided to receive a memory card in case memory beyond what is available in slots 126 is required. One edge of the processor base board 100 is formed into a card edge connector 120 for connecting into the system backplane board 102.

Figure 4A:
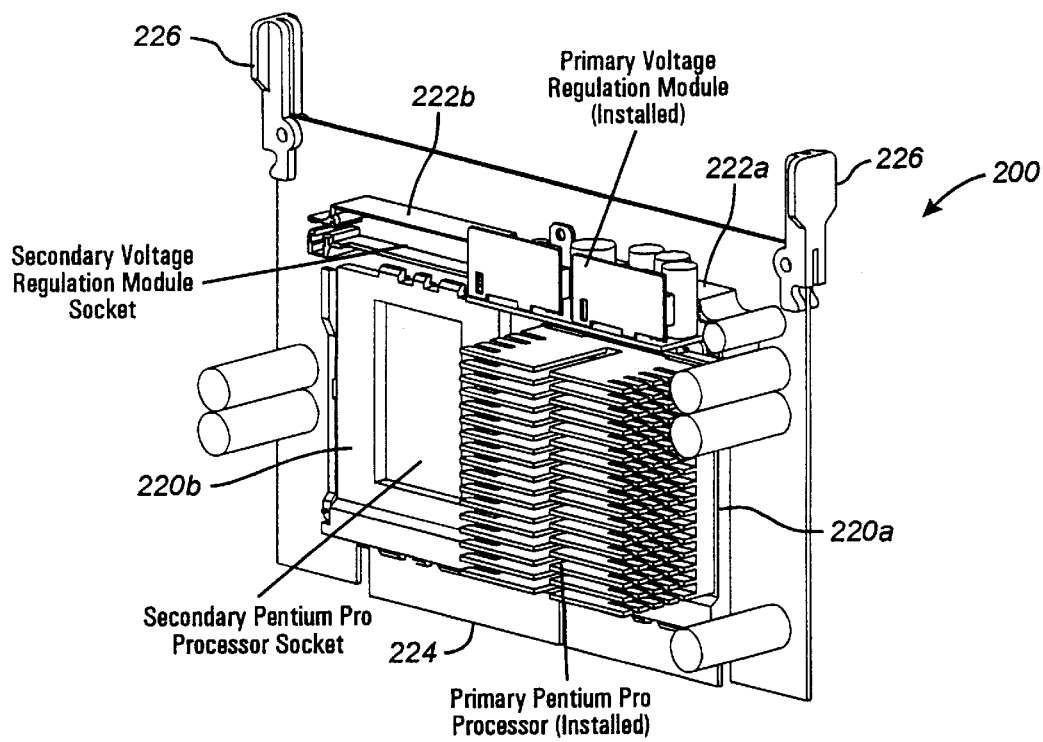
FIG. 4A is an isometric view and FIG. 4B is a side view of a Pentium Pro processor board according to the preferred embodiment.
Figure 4B:
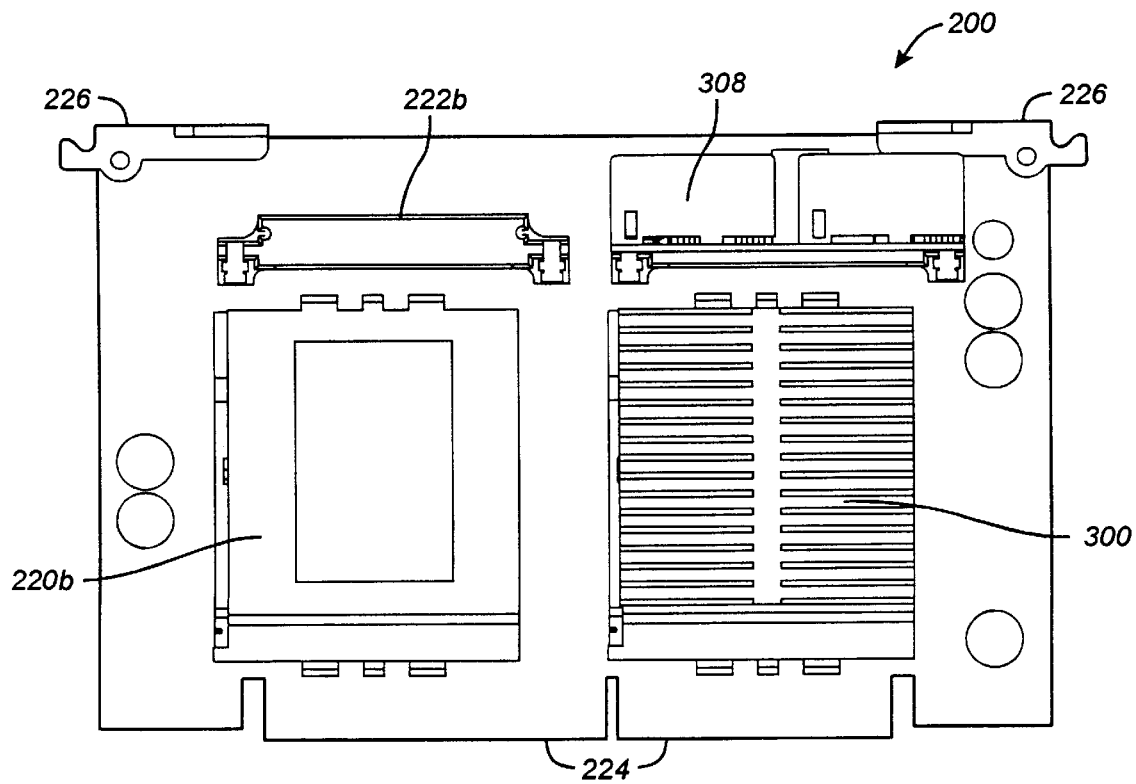

FIGS. 4A and 4B illustrate further details of the Pentium Pro processor board 200. Connected to the Pentium Pro processor board 200 are a primary socket 220a and secondary socket 220b for receiving primary and secondary Pentium Pro processors. Also connected to the Pentium Pro processor board 200 are primary and secondary voltage regulation module sockets 222a and 222b. The primary Pentium Pro processor socket 220a is illustrated with a Pentium Pro processor 300 connected therein. The primary voltage regulation module socket 222a is illustrated with a primary voltage regulation module 308 connected therein. On a lower side of the Pentium Pro processor board 200 is formed an edge connector 224 for connecting into one of the slots 122 of the processor base board 100. On opposite sides of a top edge of the Pentium Pro processor board 200 are pivotally attached card injectors 226. The card injectors 226 work against the cage 210 to easily and securely seat the Pentium Pro processor board 200 into one of the slots 122.

The Pentium Pro processor board 200 also includes termination resistors according to the Pentium Pro processor requirements.

Figure 5A:
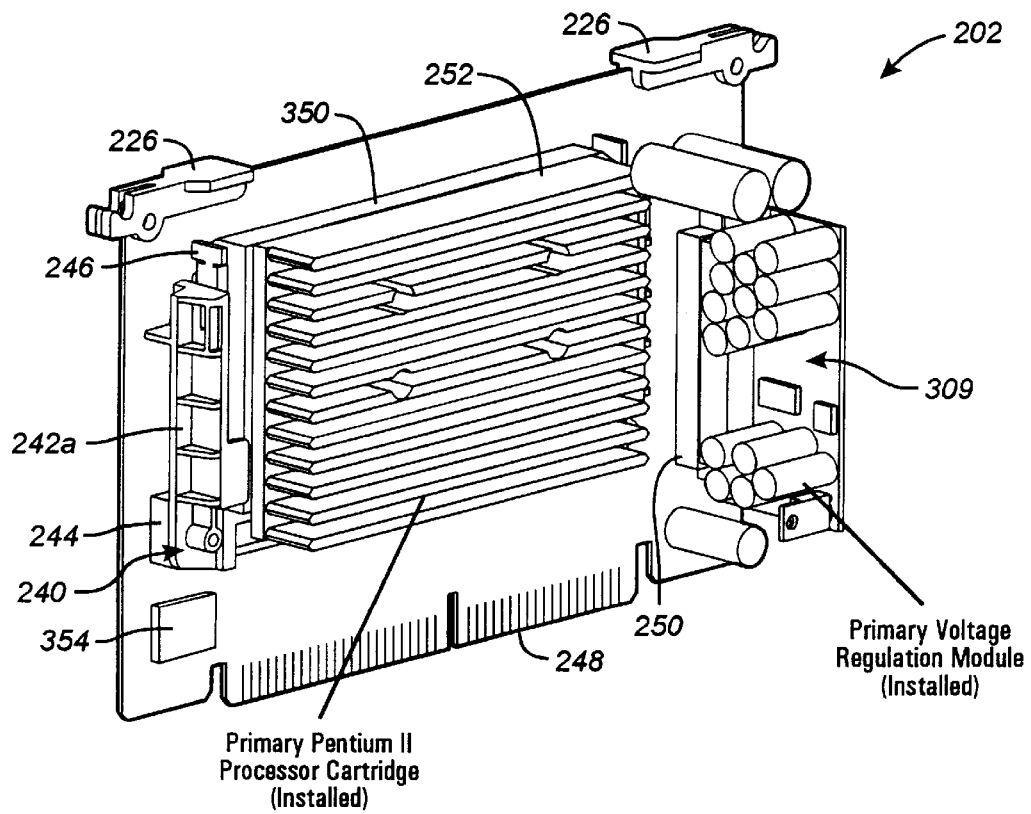
FIG. 5A is an isometric view.
Figure 5B:
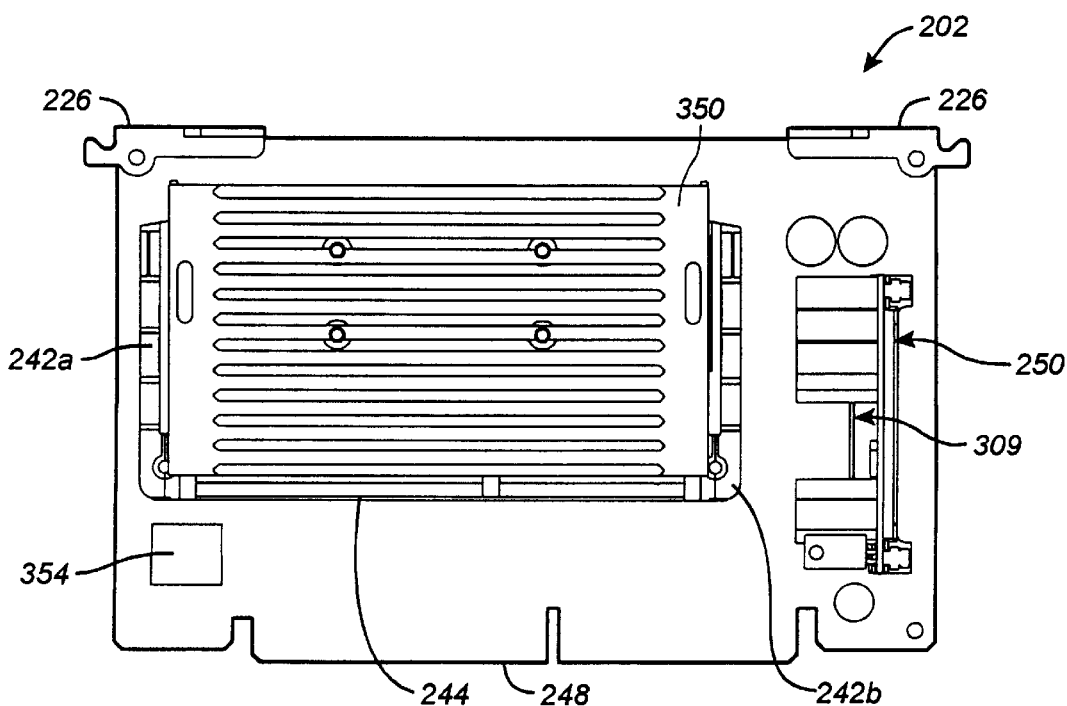
FIG. 5B is a side view and FIG. 5C is an exploded view of a Pentium II processor board according to the preferred embodiment.
Figure 5C:
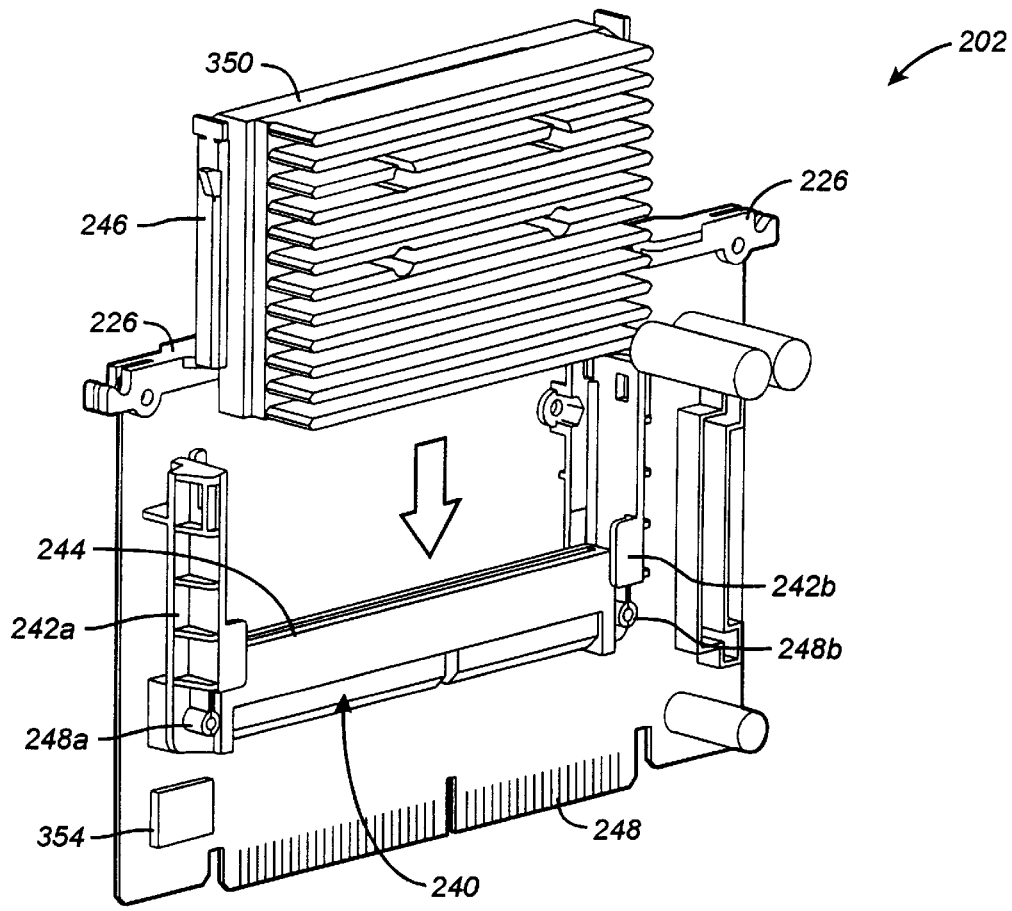

Now referring to FIGS. 5A, 5B and 5C, there is illustrated further details of the Pentium II processor board 202. In the preferred embodiment, each Pentium II processor board 202 includes connectors for receiving a single Pentium II processor 350 and a voltage regulation module (VRM) 309. It is understood that a larger processor board could be designed to accommodate more than one processor and voltage regulator.

The Pentium II processor 350 is removably securable to the processor board 202 with a right angle connector 240. The right angle connector 240 is designed to mate with the single edge contact (S.E.C.) cartridge packaging of the Pentium II processor 350 as defined in the Intel Pentium II processor data sheets. Those data sheets are hereby incorporated by reference. It is significant to note that the Pentium II processor 350 is slidably received into the right angle connector parallel to the plane of the Pentium II processor board 202, as illustrated in FIG. 5C.

The right angle connector 240 is comprised of a pair of opposing retention arms 242a and 242b; and a slot connector 244. The opposing retention arms 242a–b mate with left and right latches 246a and 246b of the Pentium II processor 350 to hold the processor in a position so that it's heatsink 252 faces outward from the plane of the board. The slot connector 244 includes a plurality of contacts on a processor end and a board end. The slot connector 244 includes two rows of contacts (not shown) on the processor end for electrically connecting with a plurality of edge fingers (not shown) of the Pentium II processor 350. A plurality of pins extend from the board end of the slot connector 244 and into the Pentium II processor board 202 for electrically connecting the slot connector 244 to traces on the Pentium II processor board 202. A pair of machine screws 248a and 248b extend through bore holes on opposing sides of the slot connector 244 and a retention arms 242a–b to mechanically secure the right angle connector assembly 240 to the Pentium II processor board 202. More details on the right angle connector are found in U.S. patent application Ser. No. 08/871,234 entitled PROCESSOR CARTRIDGE CONNECTOR, filed concurrently herewith and hereby incorporated by reference.

On one edge of the Pentium II processor board 202 is formed an edge connector 248 for connecting into one of the slots 122 of the processor base board 100. On corners of the opposing edge are pivotally attached card injectors 226. The card injectors 226 work against the cage 210 to easily and securely seat the Pentium II processor board 202 into one of the slots 122.

The voltage regulation module 309 is removably securable to the processor board 202 with a connector 250. Power is supplied to the Pentium II processor board 202 through the card edge connector 248. The voltage regulation module 309 converts 12 volt power supplied to the card edge connector 248 into a voltage required by the Pentium II processor 350. The Pentium II processor includes voltage identification pins (VID[4:0]) which are received by the voltage regulation module to determine the voltage required by the processor 350. In the preferred embodiment, the voltage required by the processor core is 1.8 v. Also included in the Pentium II processor is a level two cache. A 3.3 v voltage required by the level two cache is preferably supplied directly from the card edge connector 248.

The Pentium II processor board 202 also includes GTL+ termination resistors according to the Pentium II processor requirements. For this purpose, a secondary voltage regulation module 354 is provided to convert a 5 v power signal received from the card edge connector 248 into a 2.5 v power signal. The 2.5 v power is supplied to the CMOS I/O signal pull-up resistors and level shifting logic (discussed below).

Figure 6:
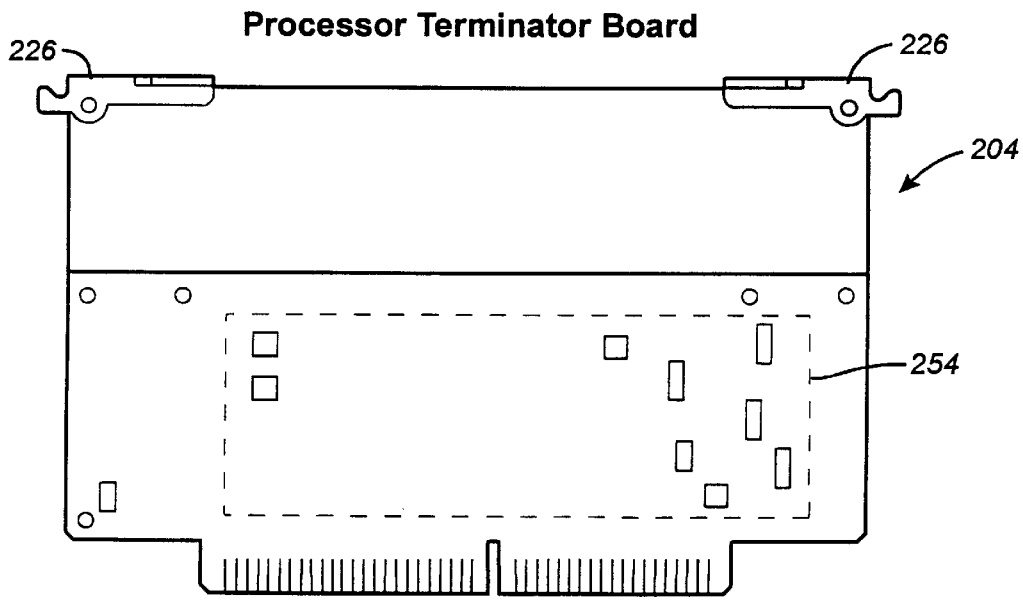
FIG. 6 is a side view of a processor terminator board according to the preferred embodiment.

Referring now to FIG. 6, there is illustrated further details of the processor terminator board 204. The Pentium Pro and Pentium II processors use low voltage swing I/O buffers which are an enhancement of Gunning Transceiver Logic (GTL+). External pull-up resistors 254 are desirable to provide a high logic level and terminate each end of the processor bus or each trace. Each of the slots 122a and 122b are endpoints for the processor bus traces. Because each of the processor boards 200 and 202 include termination resistors the processor bus is properly terminated at the processor board end. However, if only one processor board 200 or 202 is required, the processor terminator board 204 is installed into the empty slot 122a or 122b to terminate the processor bus. When two processor boards 200 or 202 are used, the processor terminator board 204 is not needed.

Figure 7:
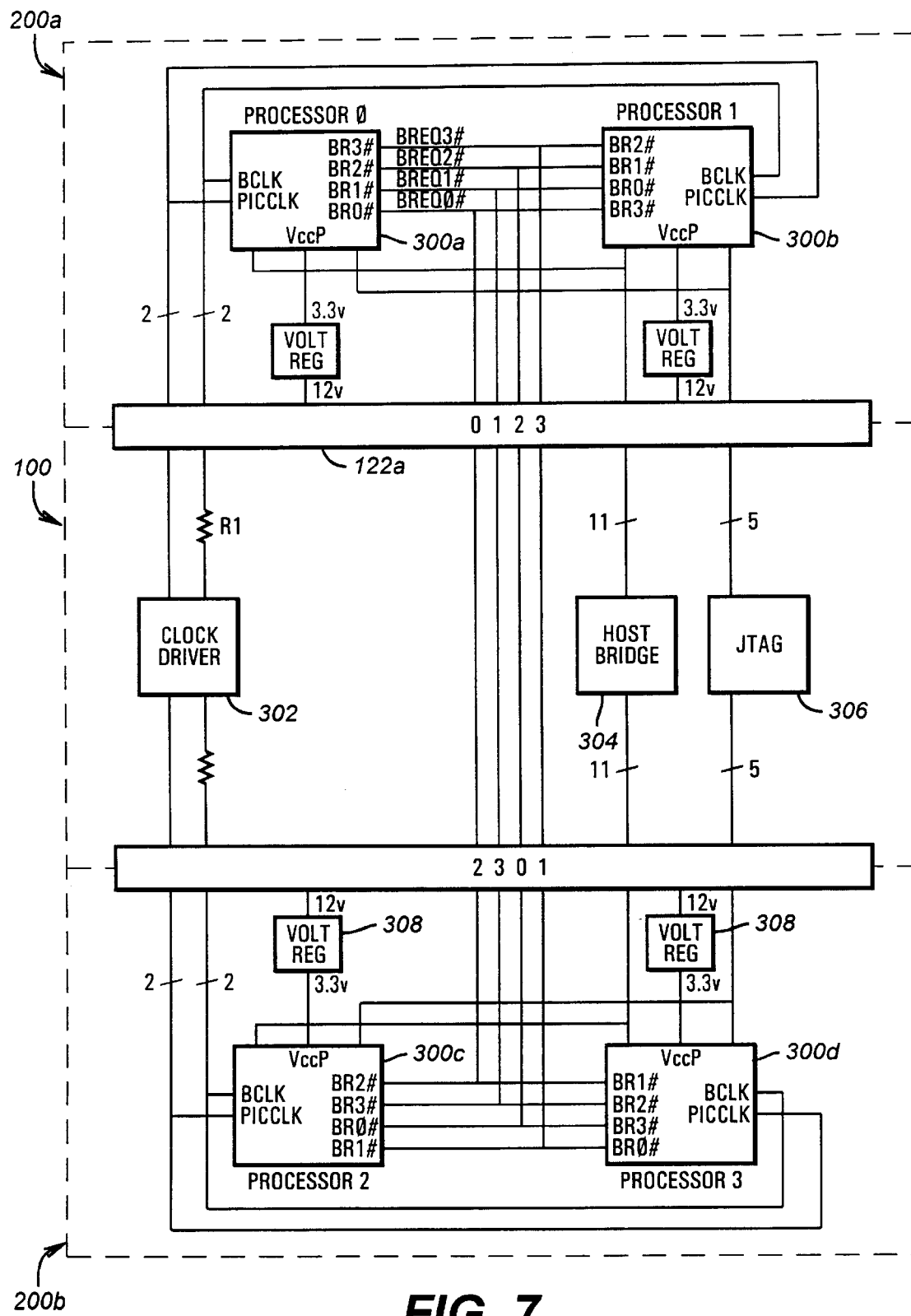
FIG. 7 is a block diagram illustrating circuitry connecting a pair of Pentium Pro processor boards to the processor base board according to the preferred embodiment.

Referring now to FIG. 7, there is illustrated a block diagram of certain circuitry contained on the processor base board 100 and a pair of Pentium Pro processor boards 200a and 200b. It is important to recognize that there is other circuitry contained on the illustrated boards but for simplicity it is not shown.

The Pentium Pro processor boards 200a and 200b each contain up to two Pentium Pro processors 300a and 300b; and 300c and 300d respectively. Each Pentium Pro processor 300 contains four bidirectional bus request (BR[0:3]#) signals to support round robin arbitration for bus access. The bus request signals are connected as follows:

| Bus Signal | Processor 300a Pins | Processor 300b Pins | Processor 300c Pins | Processor 300d Pins |
| --- | --- | --- | --- | --- |
| BREQ0# | BR0# | BR3# | BR2# | BR1# |
| BREQ1# | BR1# | BR0# | BR3# | BR2# |
| BREQ2# | BR2# | BR1# | BR0# | BR3# |
| BREQ3# | BR3# | BR2# | BR1# | BR0# |

The bus request signals are preferably provided at a 3.3 v level.

Each of the Pentium Pro processors 300a–d receive individual BCLK and PICCLK signals from a clock driver 302, such as a W4965-01 clock driver from IC Works. The BCLK and PICCLK signals are provided at a 3.3 v level. Before the BCLK signals are driven off the processor base board, they are driven through a resistor R1. The resistor R1 is preferably a 33 ohm resistor which simply acts as a dampening resistor in this configuration. Although not shown, the PICCLK signal is driven through multiple 74LVT244B buffers on the processor base board 100 so that a buffered version of the PICCLK is provided to each processor 300a–d.

Mounted onto the processor base board 100 is a host bridge 304, such as a Champion v1.0 made by Reliance Computer Corp. The host bridge 304 connects the processors 300a–d to the remaining circuitry of the computer system C. In addition to the various address, data and control signals, each processor 300a, 300b, 300c and 300d is to an address-20 mask signal (A20M#), an ignore numeric error signal (IGNNE#), an interrupt signal (INTR#) and a non-maskable interrupt signal (NMI). The processors 300a–b are connected to a first system management interrupt signal (SMI1) and the processors 300c–d are connected to a second SMI2 signal. The processors 300a–b are connected to a first initialization signal (INIT1) and the processors 300c–d are connected to a second initialization signal (INIT2). Each of the processors 300a–d are connected to a FLUSH# signal from the host bridge 304. The signals provided by the host bridge 304 are provided at 3.3 v. A boundary scan device is connectable to a JTAG connector 306 for testing the processors 300. A number of test signals comprise the JTAG signals, including a test clock (TCK) signal, a serial test data input (TDI) signal, a serial test data output (TDO) signal, a TMS signal and a test reset (TRST) signal. The boundary scan signals are driven from the processor base board at 3.3 v.

For further details on the GTL+ signaling, power and mechanical requirements of the Intel Pentium Pro processors, the reader may refer to the Pentium Pro datasheets published by Intel Corporation and hereby incorporated by reference.

Figure 8:
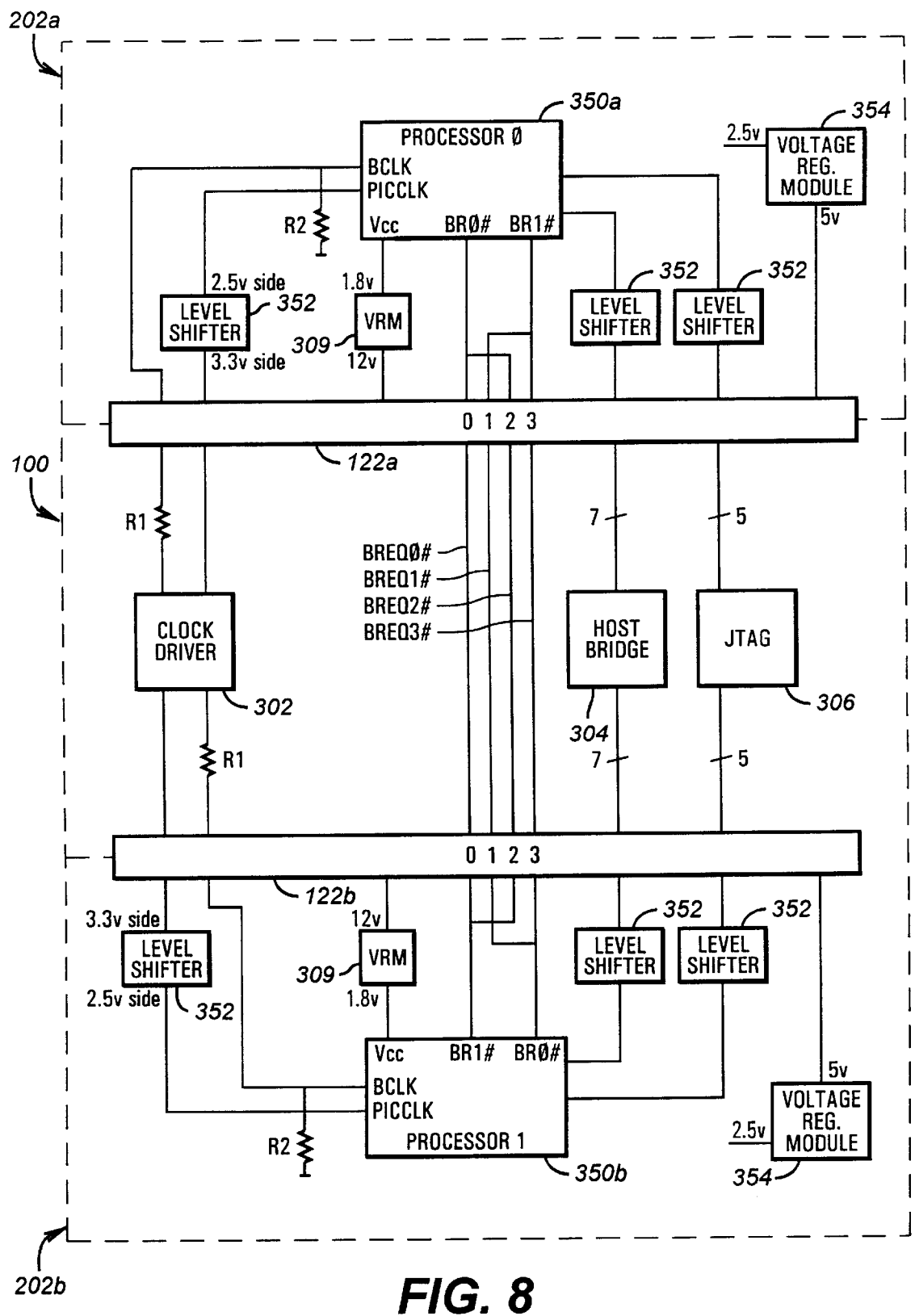
FIG. 8 is a block diagram illustrating circuitry connecting a pair of Pentium II processor boards to the processor base board according to the preferred embodiment.

Referring now to FIG. 8, there is illustrated a block diagram of certain circuitry included on the processor base board 100 and a pair of Pentium II processor boards 202a and 202b. Again, it is important to recognize that there is other circuitry contained on the illustrated boards but for simplicity it is not shown.

The Pentium II processor boards 202a and 202b are each capable of securing a single Pentium II processor 350a and 350b respectively. Certain modifications are necessary to properly interface the Pentium II processors 350a–b to the processor base board 100. These modifications are made to the Pentium II processor boards 202a–b. Specifically, a number of voltage level shifters 352 and a voltage regulator module 309 adapt the 3.3 v signals and 5 v power supply to operate within the specifications of the Pentium II processors 350a–b. It is noted that the changes are made to the processor boards 202a–b without requiring changes to the processor base board 100.

Each Pentium II processor 350a–b contains two bidirectional bus request (BR[0:1]#) signals to support alternating arbitration for bus access. Although only two bus request signals are needed for the Pentium II processor boards 202a–b, the Pentium II processors 350a–b can utilize the Pentium Pro bus request signals included on the processor base board 100 by way of a special mapping. The bus request signals are connected as follows:

| Bus Signal | Processor 350a Pins | Processor 350b Pins |
| --- | --- | --- |
| BREQ0# | BR0# | BR1# |
| BREQ1# | BR1# | BR0# |
| BREQ2# | BR0# | BR1# |
| BREQ3# | BR1# | BR0# |

The bus request signals are preferably provided at a GTL+ levels.

Each of the Pentium II processors 350a–b receive individual BCLK and PICCLK signals from a clock driver 302, such as a W4965-01 clock driver from IC Works. The BCLK and PICCLK signals are provided from the clock driver 302 at a 3.3 v level. Before the BCLK signals are driven off the processor base board 100, they are driven through a resistor R1. On the Pentium II processor boards 202a–b, the BCLK signals are pulled low through a resistor R2, thereby creating a voltage divider having a multiplying effect on the voltage of R2/(R1+R2). Thus, a 3.3 v signal is reduced to 2.48 v at the input of the Pentium II processor 350a–b. The resistors R1 are preferably a 33 ohm resistor and the resistors R2 are preferably 100 ohms. The PICCLK signal is shifted from 3.3 v to 2.5 v by a level shifter 352, such as a 74LVT244B made by Texas Instruments.

The host bridge 304 signals and JTAG boundary scan signals described above are again provided by the processor base board 100. However, in this case the Pentium II processor boards 202a–b adapt the 3.3 v signals to 2.5 v levels through additional level shifters 352. The level shifter 352 receive 2.5 v power from the secondary voltage regulation module 354. The 2.5 v level is required by the Pentium II processor 350 for its CMOS I/O buffers. Additionally, the CMOS I/O signals, such as A20M#, IGNNE#, INTR#, NMI SMI, INIT, FLUSH#, and the JTAG test signals are pulled-up and terminated to the 2.5 v power supplied from the secondary voltage regulation module 354.

According to the Intel Pentium II specification, the processor core of the Pentium II requires a certain voltage level (VCC) and a level two cache contained therein requires a certain voltage level (VCCL2). Because the processor base board 100 does not supply the voltage required by the Pentium II processors 350a–b (and future processors), the voltage regulator module 309 is included on the Pentium II processor boards 202a–b to provide the special processor voltage according to the VID[4:0] pins, as discussed above. In the preferred embodiment, the processor VCC pins are supplied with 1.8 v power from the voltage regulator module 309 and the level two cache VCC pins are supplied with 3.3 v power from the processor base board 100.

Therefore, by adapting voltage levels of certain signals and power supplies to work with a particular type of processor and adapting the bus request signals to work with the processor, boards 202a–b are easily adaptable to work with the processor base board 100.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method of supporting more than one type of processor in a computer system, the method comprising the steps of:
    providing a base board having one or more connectors each operable to receive a processor board, said base board having a number of bus request signals for supporting multiple processors, the number of bus request signals equal to a maximum number of processors supported;
    providing a first processor board operable to connect to said base board, said first processor board operable to receive at least one processor, said first processor board operable to connect each bus request signal to each processor if the processor is of a first type; and
    providing a second processor board operable to connect to said base board, said second processor board operable to receive at least one processor, said second processor board operable to connect two or more bus request signals to each processor if the processor is of a second type.

2. The method of claim 1, wherein the base board is operable to provide a certain voltage to the first and second processor boards, the method further comprising the step of:
    providing a voltage regulator on the first or second processor board to convert said certain voltage into a voltage compatible with the processor receivable therein if the processor receivable therein requires a voltage different from the certain voltage.

3. The method of claim 1, wherein the base board is operable to provide a plurality of bus signals to the first and second processor boards at a certain voltage level, the method further comprising the steps of:
    providing a voltage level shifter on the first or second processor board to convert said bus signals into a voltage compatible with the processor receivable therein if the processor receivable therein requires a voltage level different from the certain voltage.

4. The method of claim 1, wherein the base board is operable to provide a clock signal to the first and second processor boards at a certain voltage level, the method further comprising the steps of:
    providing a first series resistor operable to pass through said clock signal, said first series resistor placed on said base board; and
    providing a second resistor having one end connected to ground and an opposite end connected to said clock signal, said second resistor placed on said first or second processor board if the processor receivable therein requires a voltage less than the certain voltage, and
    whereby said first and second resistors form a voltage divider.

5. An apparatus for supporting more than one type of processor in a computer system, the apparatus comprising:
    a base board having one or more connectors each operable to receive a processor board, said base board having a processor bus including a number of bus request signals for supporting multiple processors, the number of bus request signals equal to a maximum number of processors supported;
    a first processor board operable to connect to said base board, said first processor board operable to receive at least one processor of a first type, said first processor board operable to connect each bus request signal to each processor; and
    a second processor board operable to connect to said base board, said second processor board operable to receive at least one processor of a second type, said second processor board operable to connect two or more bus request signal to each processor.

6. The apparatus of claim 5, wherein the base board is operable to provide a certain voltage to the first and second processor boards and wherein the first and second processor board further comprise:
    a voltage regulator to convert said certain voltage into a voltage compatible with the processor receivable therein if the processor receivable therein requires a voltage different from the certain voltage.

7. The apparatus of claim 5, wherein the base board is operable to provide a plurality of bus signals to the first and second processor boards at a certain voltage level, wherein the first and second processor boards further comprise:
    a voltage level shifter to convert said certain voltage of said bus signals into a voltage compatible with the processor receivable therein if the processor receivable therein requires a voltage level different from the certain voltage.

8. The apparatus of claim 5, wherein the base board is operable to provide a clock signal to the first and second processor boards at a certain voltage level, the apparatus further comprising:
    said base board including a first series resistor operable to pass through said clock signal; and
    said first and second processor board including a second resistor having one end connected to ground and an opposite end connected to said clock signal, said second resistor placed on said first and second processor board if the processor receivable therein requires a voltage less than the certain voltage, and whereby said first and second resistors form a voltage divider.

9. The apparatus of claim 5, further including:

a terminator board operable to connect to said base board and terminate the processor bus if one of said base board connectors is not occupied by a first or second processor board.

10. The apparatus of claim 5, wherein the first processor type is a Pentium Pro processor and the second processor type is a Pentium II processor.

11. An apparatus for supporting more than one type of processor in a computer system, the apparatus comprising:

a system board having connectors operable to connect with a hard disk drive;

a base board having one or more connectors each operable to receive a processor board, said base board having a number of bus request signals for supporting multiple processors, the number of bus request signals equal to a maximum number of processors supported;

a first processor board operable to connect to said base board, said first processor board operable to receive at least one processor of a first type, said first processor board operable to connect each bus request signal to each processor; and a second processor board operable to connect to said base board, said second processor board operable to receive at least one processor of a second type, said second processor board operable to connect two or more bus request signal to each processor a hard disk drive connected to said system board, said hard disk drive operable to provide data for each processor.

12. The apparatus of claim 11, wherein the base board is operable to provide a certain voltage to the first and second processor boards and wherein the first and second processor board further comprise:

a voltage regulator to convert said certain voltage into a voltage compatible with the processor receivable therein if the processor receivable therein requires a voltage different from the certain voltage.

13. The apparatus of claim 11, wherein the base board is operable to provide a plurality of bus signals to the first and second processor boards at a certain voltage level, wherein the first and second processor boards further comprise:

a voltage level shifter to convert said certain voltage of said bus signals into a voltage compatible with the processor receivable therein if the processor receivable therein requires a voltage level different from the certain voltage.

14. The apparatus of claim 11, wherein the base board is operable to provide a clock signal to the first and second processor boards at a certain voltage level, the apparatus further comprising:

said base board including a first series resistor operable to pass through said clock signal; and said first and second processor board including a second resistor having one end connected to ground and an opposite end connected to said clock signal, said second resistor placed on said first and second processor board if the processor receivable therein requires a voltage less than the certain voltage, and whereby said first and second resistors form a voltage divider.

15. The apparatus of claim 11, further including:

a terminator board operable to connect to said base board and terminate the processor bus if one of said base board connectors is not occupied by a first or second processor board.

16. The apparatus of claim 11, wherein the first processor type is a Pentium Pro processor and the second processor type is a Pentium II processor.

17. An apparatus for supporting more than one processor type in a computer system, the apparatus comprising:

a base board, including:
one or more card edge connectors mounted perpendicular to a plane of the base board, said card edge connectors mounted parallel to each other;

a first processor board connectable to one of said card edge connectors, including:
one or more pin grid array sockets mounted to a plane of the first processor board each for receiving a first processor; and a second processor board connectable to one of said card edge connectors, including:
one or more single edge contact connectors mounted to a plane of the second processor board each for receiving a second processor, said single edge contact connector having first and second contact ends, the first end mounted perpendicular to the plane of the second processor board, the second end being at a right angle to the first end for receiving a processor parallel to the plane of the second processor board.

18. The apparatus of claim 17, further comprising:

said first processor board including a plurality of contacts formed along one edge for matably coupling to one of said card edge connectors; and said second processor board including a plurality of contacts formed along one edge for matably coupling to one of said card edge connectors.

19. The apparatus of claim 18, wherein the first processor is a Pentium Pro processor and the second processor is a Pentium II processor.

* * * * *